Aug. 31, 1948.  J. D. GIBSON  2,448,092
DEHYDROFLUORINATION PROCESS
Filed Sept. 5, 1944
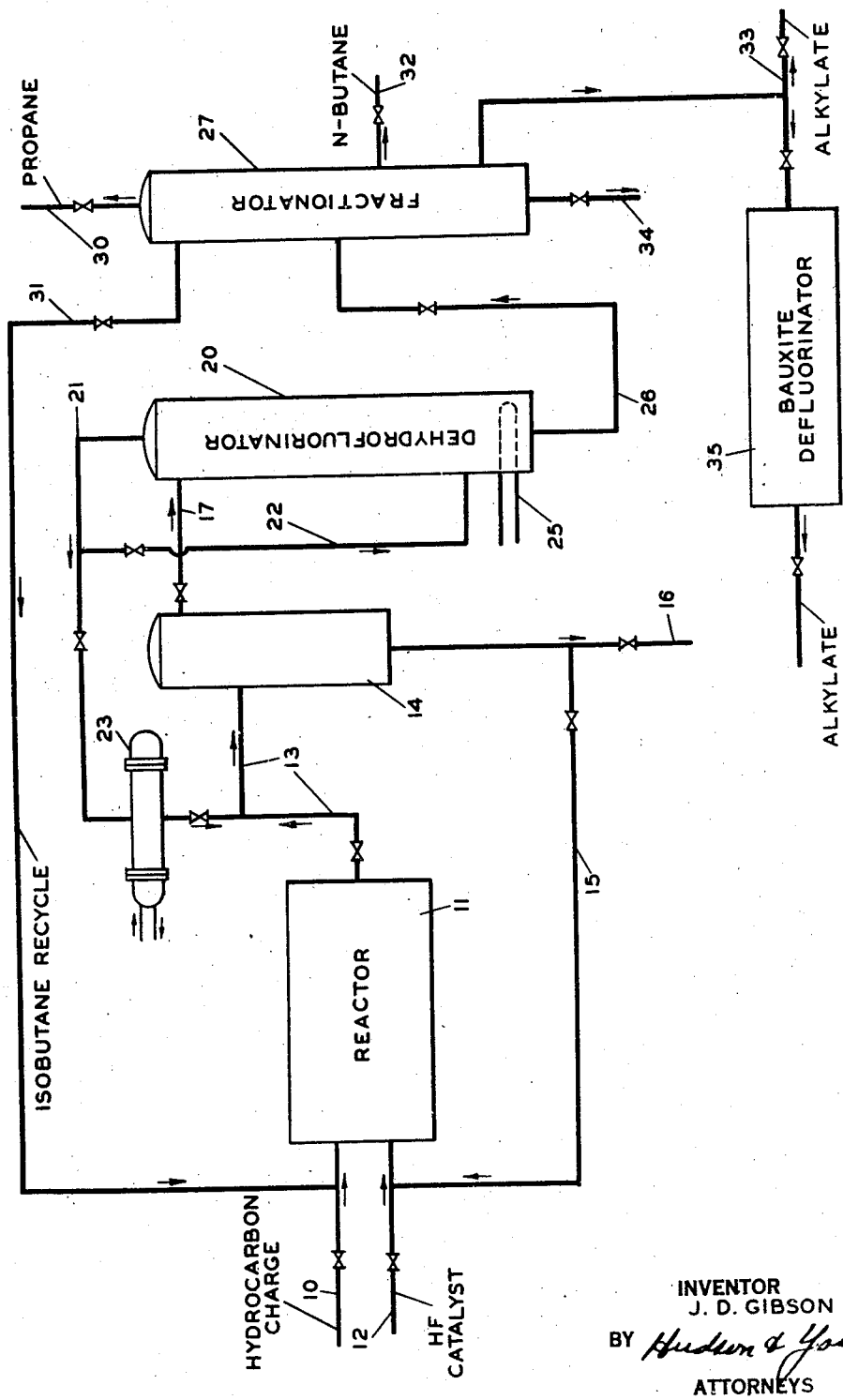
INVENTOR
J. D. GIBSON
BY Hudson & Young
ATTORNEYS Patented Aug. 31, 1948

2,448,092

UNITED STATES PATENT OFFICE 2,448,092

DEHYDROFLUORINATION PROCESS

James D. Gibson, Bartlesville, Okla., assignor to Phillips Petroleum Company, a corporation of Delaware Application September 5, 1944, Serial No. 552,764

11 Claims. (Cl. 260—683.4)

This invention relates to the treatment of organic materials to remove therefrom organic fluorine-containing compounds. In one general embodiment, it relates to the removal, from hydrocarbon materials, of fluorine-containing compounds. In a more specific embodiment, my invention relates to the removal of at least a major portion of organically bound fluorine from hydrocarbon materials containing organically bound fluorine in an amount not greater than 1 per cent by weight, and often in an amount not greater than about 0.1 to about 0.05 per cent by weight.

In the manufacture of hydrocarbons by processes in which fluorine-containing catalysts are used, small proportions of organic fluorine-containing by-products are formed. These processes may involve reactions such as polymerization and alkylation of relatively low-boiling hydrocarbons to produce motor fuel hydrocarbons in the presence of catalysts comprising one or more of such fluorine compounds as hydrofluoric acid, boron trifluoride, and the like. Although the exact nature or composition of the organic fluorine-containing by-products which may be formed has not been definitely established, they are believed to be predominantly alkyl and/or aryl fluorides. They are not completely removed by washing the hydrocarbons with alkali solutions. They tend to decompose at elevated temperatures, such as those employed in fractional distillation of the hydrocarbons, thereby forming hydrofluoric acid, which is corrosive, especially in the presence of moisture. In gases, they may thus cause corrosion of handling equipment; in liquid motor-fuel hydrocarbons, they are undesirable for reasons that are obvious.

As has been disclosed and discussed in Frey Patent 2,347,945, issued May 2, 1944, organic fluorine compounds may be removed from hydrocarbon materials containing them by contacting such hydrocarbon materials with solid porous contact materials. Contact materials which have been found suitable include those known to be catalytically active for hydrogenation or dehydrogenation reactions, such as alumina gel, activated alumina, dehydrated bauxite, chromium oxide, mixtures of alumina and chromium oxide, zirconia, limonite (ferric oxide), calcium oxide, magnesium oxide, and the like, metals of the iron group, especially finely divided nickel deposited on an inert support, and the like. Such contact materials appear to adsorb preferentially the organic fluorine compounds, although the exact mechanism involved is not fully known treated may be in either the liquid or the vapor phase. Also, according to the aforementioned Frey Patent 2,347,945, in a process for alkylating relatively low-boiling alkylatable hydrocarbons in the presence of fluorine compounds, a selected part or all of the hydrocarbon effluent from an alkylating zone may be advantageously subjected to the action of a solid porous contact material to remove organic fluorine compounds.

I have now found that organic materials containing such organic fluorine-containing compounds can be treated in the presence of a dehydrofluorination catalyst to effect a decomposition of such organic fluorine-containing compounds with improved results when a minor amount of free hydrogen fluoride is present in the charge to the dehydrofluorination catalyst and throughout the zone in which the organic material is in contact with the dehydrofluorination catalyst. At the point at which the content of free hydrogen fluoride is at its lowest concentration it should be present in an amount at least 0.01 per cent by weight of the organic material and not to exceed about 0.1 per cent by weight. A preferred embodiment of my invention can be practiced by using a dehydrofluorination catalyst in conjunction with a fractional distillation zone to effect a decomposition of such fluorine-containing organic compounds to free hydrogen fluoride and a simultaneous removal of the free hydrogen fluoride with addition of a small amount of free hydrogen fluoride to or near the bottom of the zone in which the dehydro-fluorination catalyst is present. My invention can be applied with particular advantage to the removal of fluorine compounds from effluents of a hydrocarbon conversion process wherein hydrofluoric acid has been employed as a conversion catalyst, either alone or with a promoter such as boron trifluoride, or the like. In the practice of the process of my invention, hydrocarbon effluents of the conversion process, such as an alkylation or an isomerization process, are passed from a catalyst separator to fractional distillation means. In this form the hydrocarbon effluents will have associated with them relatively minor amounts of hydrogen fluoride and of organic fluorine compounds; when such hydrocarbon effluents are in the liquid phase, as generally will be the case, these fluorine compounds will be present more or less completely therein as dissolved constituents, although an additional small amount of entrained hydrofluoric acid will sometimes be included. The low-boiling product, a hydrogen fluoride fraction; generally this fraction will also contain a low-boiling paraffin hydrocarbon, such as propane, a butane, or the like, in an amount at least sufficient to form with the hydrogen fluoride a minimum-boiling azeotropic mixture.

An object of this invention is to effect substantially complete removal of fluorine from hydrocarbon fluids containing organic fluorine compounds as impurities.

A further object of this invention is an improved process for obtaining a substantially fluorine-free alkylate from the alkylation of hydrocarbons in the presence of a catalyst comprising a fluorine compound.

Another object of my invention is to remove organic fluorine compounds from other organic materials.

A further object of my invention is to decompose organic fluorine compounds to release hydrogen fluoride.

Still another object of my invention is to effect a simultaneous removal of hydrogen fluoride and organic fluorine-containing compounds from low-boiling hydrocarbon materials which contain such fluorine compounds as impurities.

Other objects and advantages of my invention will become apparent, to one skilled in the art, from the accompanying disclosure and discussion.

One specific and preferred embodiment of my invention will now be described in connection with the accompanying drawing which forms a part of this application and which is a diagrammatic flow sheet showing an arrangement of apparatus which may be used for the practice of a preferred modification of my invention.

A suitable hydrocarbon charge is passed through pipe 10 to reactor 11 and a hydrogen fluoride catalyst is passed through pipe 12 to reactor 11. As previously discussed, the invention can be applied to the effluents of any one of a number of processes. Generally, however, the invention will be applied to paraffinic hydrocarbon effluents of an alkylation process or of an isomerization process. When the process is one of alkylation the hydrocarbon charge will comprise a mixture of paraffins and olefins and the reaction conditions maintained in the reaction will be those well known to the art. When the process is one for isomerization of paraffin hydrocarbons the hydrocarbon charge will comprise paraffins to be isomerized and the reaction conditions will be somewhat similar to those known for alkylation so far as temperature, pressure and contact time are concerned. In either event hydrogen fluoride may be the essential catalyst and, if desired, may be promoted by from about 1 to about 10 per cent by weight of boron trifluoride. Effluents of the reactor 11 are passed through pipe 13 to separator 14 wherein the separation is effected between hydrocarbon effluents and hydrofluoric acid. The hydrofluoric acid is removed through pipe 15 and may be returned at least in part to the reactor 11. Generally it is desirable to pass a portion of the used catalyst to purification equipment, not shown, through pipe 16.

The hydrocarbon material, generally in liquid phase and containing a minor amount of dissolved hydrogen fluoride, is passed from separator 14 through pipe 17 to dehydrofluorinator 20 which is a fractional distillation zone combined with a dehydrofluorination zone. As an example, when isobutane is alkylated with butenes in the presence of concentrated hydrofluoric acid as the alkylation catalyst a total hydrocarbon phase has been obtained which contains about 0.01 to about 0.05 weight per cent of fluorine present as organically bound fluorine and also between about 0.3 and about 0.7 weight per cent of dissolved hydrogen fluoride. Dehydrofluorinator 20 may comprise a vertical distillation column containing a suitable packing which may serve both to give adequate contact between vapor and liquid so that efficient fractional distillation is obtained, as is well known to those skilled in the art, and which will also act as a dehydrofluorination catalyst. Such packing material may be Raschig rings of iron or of aluminum, preferably of aluminum alloyed with a small amount of copper, or may be relatively large granular pieces of metal oxides such as partially dehydrated bauxite, limonite, or the like, preferably relatively free from substantial amounts of silica. One particularly desirable packing material comprises iron Raschig rings which have been oxidized at a relatively low temperature, while wet, by contact with the free oxygen of the air and which have been subsequently treated with hydrogen fluoride, either by a separate step or by use in this process. As another modification of the combination of a fractional distillation zone and dehydrofluorination zone, a regular fractional distillation column with the conventional bubble trays may be employed with an intermediate section containing a dehydrofluorination catalyst such as herein discussed.

Dehydrofluorinator 20 is so operated that hydrogen fluoride and any boron trifluoride or the like, if such has been used, is removed by distillation as a low-boiling fraction, generally accompanied by at least a sufficient amount of a low-boiling paraffin hydrocarbon to form a minimum-boiling azeotropic mixture therewith. This low-boiling fraction may be removed, preferably as a gaseous mixture, through pipe 21 and at least a major portion of it is passed through cooler and condenser 23 and returned to pipe 13 and separator 14. A minor portion of this mixture is passed from pipe 21 through pipe 22 to a low point of dehydrofluorinator 20, preferably at or near the bottom of the dehydrofluorination zone which is associated with the distillation zone, as previously discussed. In a preferred embodiment, the material which is passed through pipe 17 is passed as a liquid to the top of the fractional distillation zone as a combined feed and reflux stream and the mixture passed through pipe 22 is passed as a gaseous mixture to a point well below the point of introduction of this combined feed and reflux stream. This material comprising free hydrogen fluoride should be introduced in an amount such that a concentration of free hydrogen fluoride at the point of introduction is not in excess of about 0.1 per cent by weight of free hydrogen fluoride in the resulting mixture.

Heat is supplied to dehydrofluorinator 20 by means of suitable heating equipment illustrated by heating coil 25. Satisfactory operation is generally obtained with a temperature at this point between about 150 and about 300° F. Although temperatures higher than the upper part of this range or lower than the lower part of this range may be used in some instances, it will be generally found that an excessive time will be required to obtain satisfactory removal of organic fluorine compounds if lower temperatures are used, and that excessively high pressures will be encountered in connection with the distillation if higher temperatures are used.

A high-boiling liquid fraction which is free from free-hydrogen fluoride and also substantially free from organic fluorine compounds is removed as a kettle product through pipe 26 and passed to separating means illustrated by fractionator 27. A low-boiling normally gaseous fraction containing propane and lighter hydrocarbons is removed through line 30 and discharged from the system. A recycle stream, which may be isobutane in the case of an alkylation process, is removed through pipe 31 and returned to reactor 11. Unreacted normal butane may be removed through pipe 32. A light alkylate fraction may be recovered as a product of the process through pipe 33, and a heavy alkylate fraction may be recovered through pipe 34. If desired or found necessary, the alkylate fraction may be subjected to further treatment to remove any residual fluorine-containing compounds. Such a treatment may be carried out by passing the alkylate fraction at a suitable temperature between about 150 and 550° F. through a mass of granular bauxite contained in bauxite defluorinator 35, in accordance with the disclosure and teachings of Frey Patent 2,347,945. When dehydrofluorinator 20 utilizes a catalyst zone containing a granular dehydrofluorination catalyst as hereinbefore discussed, this granular dehydrofluorination catalyst may comprise the material which results when the bauxite used in defluorinator 35 has become so saturated with fluorine that satisfactory operation is no longer obtained.

It will be readily appreciated by those skilled in the art that the drawing illustrates the use of conventional equipment which is not shown in detail, and that much conventional equipment such as heaters, coolers, condensers, reflux equipment, pumps, compressors, catalyst chambers, and the like, will be necessary in the practice of any specific embodiment of my invention and can readily be adapted by one skilled in the art in the light of the teachings and discussion presented herein.

The following data are given to further illustrate and exemplify my invention, but it will be understood that these data are exemplary only and are not to be construed as limiting broader embodiments of the invention.

A total hydrocarbon effluent stream, practically free from hydrogen fluoride, from the alkylation of isobutane with butylenes in the presence of a hydrofluoric acid catalyst, was passed in liquid phase down a ¾-inch tower, 5 feet in length, packed with 1/16-inch aluminum rings split longitudinally in half, countercurrent to vapors rising through the packing from the kettle on the bottom of the column. The organic fluorides decomposed into hydrogen fluoride, which was stripped from the liquid by the hydrocarbon vapors. The vapors were condensed and the hydrocarbon phase was recycled to the tower. The defluorinated hydrocarbon stream was removed from the kettle.

The following data indicate that the dehydrofluorination increased from approximately 84 per cent to 97 per cent after hydrogen fluoride was added to the hydrocarbon stream in period 4.

| Period | Temp. of tower, °F. head | Temp. of tower, °F. kettle | Pressure p. s. i. | Space velocity, liq. vol. of feed/vol. catalyst space/hr. | Reflux ratio based on feed | Org. F, wt. per cent feed | Org. F, wt. per cent effluent | Free HF, wt. per cent feed | Free HF, wt. per cent overhead vapor | Free HF, wt. per cent kettle | Per cent Dehydrofluorination |
|---|---|---|---|---|---|---|---|---|---|---|---|
| 1 | 190 | 200 | 202 | 4.6 | 0.3:1 | 0.033 | 0.0036 | 0.002 | -------- | -------- | 89 |
| 2 | 174 | 200 | 218 | 4.4 | 0.25:1 | 0.026 | 0.0055 | -------- | -------- | -------- | 79 |
| 3 | 187 | 200 | 228 | 4.4 | 0.25:1 | 0.026 | 0.0043 | -------- | 0.050 | -------- | 84 |
| 4 | 189 | 200 | 220 | 4.4 | 0.23:1 | 0.026 | 0.0009 | 0.050 | 0.31 | 0.0007 | 97 |
| 5 | 186 | 200 | 220 | 4.4 | 0.23:1 | 0.026 | 0.0007 | -------- | -------- | -------- | 97 |
| 6 | 189 | 200 | 220 | 4.4 | 0.22:1 | 0.026 | 0.0008 | -------- | -------- | -------- | 97 |

It will be readily appreciated that various modifications and embodiments of my invention may be practiced, by one skilled in the art, by following the teachings of the present disclosure without departing from the spirit thereof or from the scope of the claims.

I claim:

1. In a process for producing paraffin hydrocarbons in the motor fuel range by alkylation of a lower-boiling paraffin hydrocarbon in the presence of a hydrofluoric acid alkylation catalyst, the improvement which comprises passing effluents of such alkylation to a settling zone, removing from said zone a liquid paraffin hydrocarbon material containing dissolved hydrofluoric acid and a relatively small amount of organic fluorine compounds as impurities, passing said liquid material to the top of a fractional distillation zone packed with a bed of aluminum rings, removing as a low-boiling fraction from said zone a gaseous mixture comprising free hydrogen fluoride and low-boiling paraffin hydrocarbons, cooling and condensing a major portion of said mixture and returning same to said settling zone, passing a minor portion of said gaseous mixture to the bottom of said bed of aluminum rings, maintaining a distillation reaction temperature in said zone, to effect a distillation of free hydrogen fluoride and a decomposition of said organic fluorine compounds, and removing as a high-boiling fraction from said zone a liquid paraffinic hydrocarbon material substantially free from hydrogen fluoride and organic fluorine compounds.

2. In a process for producing paraffin hydrocarbons in the motor fuel boiling range by alkylation of a lower boiling paraffin hydrocarbon in the presence of a hydrofluoric acid alkylation catalyst, the improvement which comprises passing effluents of such an alkylation to a settling zone, removing from said zone a liquid paraffin hydrocarbon material containing dissolved hydrogen fluoride and a relatively small amount of organic fluorine compounds as impurities, passing said material to a fractional distillation zone containing a solid dehydrofluorinating material, maintaining contents of said zone at a dehydrofluorination temperature not greater than about 300° F., removing as a low-boiling fraction from said zone a gaseous mixture comprising free hydrogen fluoride and a low-boiling paraffin hydrocarbon, cooling and condensing a major portion of said mixture and returning same to said settling zone, passing a minor portion of said gaseous mixture to said fractional distillation zone at a point below that at which the aforesaid liquid paraffin hydrocarbon material is introduced, and removing as a high-boiling fraction from said zone a liquid paraffinic hydrocarbon material substantially free from hydrogen fluoride and organic fluorine compounds.

3. A process for treating hydrocarbon materials to remove organically combined fluorine therefrom, which comprises passing a hydrocarbon material containing a minor quantity of organically combined fluorine to a fractional distillation zone containing a solid dehydrofluorinating material, maintaining contents of said zone in contact with said dehydrofluorinating material at a dehydrofluorination temperature to produce free hydrogen fluoride, removing as a low-boiling fraction from said zone free hydrogen fluoride, passing free hydrogen fluoride to said zone at a point below that at which the aforesaid hydrocarbon material is introduced, and removing as a high-boiling fraction from said zone a liquid hydrocarbon material substantially free from hydrogen fluoride and from organically combined fluorine.

4. The process of claim 3 in which said free hydrogen fluoride is introduced in an amount such that the concentration of free hydrogen fluoride at that point is not greater than about 0.1 per cent by weight.

5. A process for treating a low-boiling paraffinic hydrocarbon mixture containing organic fluorine compounds in amounts such that the content of organically-bound fluorine is not greater than about 0.1 per cent by weight of said paraffinic mixture to remove said fluorine, which comprises passing such a mixture to a fractional distillation zone comprising a dehydrofluorination zone containing a solid dehydrofluorination catalyst, maintaining said dehydrofluorination zone at a dehydrofluorination temperature not greater than about 300° F., introducing said mixture to said distillation zone at a point well above the bottom of said dehydrofluorination zone, removing a mixture comprising free hydrogen fluoride from said distillation zone as a low-boiling fraction, passing free hydrogen fluoride to the bottom of said dehydrofluorination zone, and removing as a high-boiling fraction from said distillation zone a liquid paraffinic hydrocarbon mixture substantially free from hydrogen fluoride and organically combined fluorine.

6. The process of claim 5 in which a portion of said low-boiling fraction is used to supply said free hydrogen fluoride to the bottom of said dehydrofluorination zone and in which not more than about 0.1 per cent by weight of free hydrogen fluoride is present at the bottom of said dehydrofluorination zone.

7. In a process for producing paraffin hydrocarbons in the motor fuel boiling range by alkylation of a lower boiling paraffin hydrocarbon in the presence of a hydrofluoric acid alkylation catalyst, the improvement which comprises passing effluents of such an alkylation to a settling zone, removing from said zone a liquid paraffin hydrocarbon material containing dissolved hydrogen fluoride and a relatively small amount of organic fluorine compounds as impurities, passing said material to a fractional distillation zone containing a solid dehydrofluorinating material, maintaining contents of said zone at a dehydrofluorination temperature, removing as a low-boiling fraction from said zone a gaseous mixture comprising free hydrogen fluoride and a low-boiling paraffin hydrocarbon, passing a minor portion of said gaseous mixture to said fractional distillation zone at a point below that at which the aforesaid liquid paraffin hydrocarbon material is introduced, and removing as a high-boiling fraction from said zone a liquid paraffinic hydrocarbon material substantially free from hydrogen fluoride and organic fluorine compounds.

8. A process for treating hydrocarbon materials to remove organically combined fluorine therefrom, which comprises passing a hydrocarbon material containing a minor quantity of organically combined fluorine to a fractional distillation zone containing a solid dehydrofluorinating material, maintaining contents of said zone in contact with said dehydrofluorinating material at a dehydrofluorination temperature, removing as a low-boiling fraction from said zone a gaseous mixture comprising free hydrogen fluoride, passing a minor portion of said gaseous mixture to said zone at a point below that at which the aforesaid hydrocarbon material is introduced, and removing as a high-boiling fraction from said zone a liquid hydrocarbon material substantially free from hydrogen fluoride and from organically combined fluorine.

9. In a process for producing paraffin hydrocarbons in the motor fuel boiling range by alkylation of a lower boiling paraffin hydrocarbon in the presence of a hydrofluoric acid alkylation catalyst, the improvement which comprises passing effluents of such an alkylation to a settling zone, removing from said zone a liquid paraffin hydrocarbon material containing dissolved hydrogen fluoride and a relatively small amount of organic fluorine compounds, as impurities, passing said material to a distillation zone containing a solid dehydrofluorinating material, maintaining contents of said zone at a dehydrofluorination temperature, removing as a low-boiling fraction from said zone a gaseous mixture comprising free hydrogen fluoride and a low-boiling paraffin hydrocarbon, passing a minor portion of said gaseous mixture to said distillation zone, and removing as a high-boiling fraction from said zone a liquid paraffinic hydrocarbon material substantially free from hydrogen fluoride and organic fluorine compounds.

10. In a process for the conversion of hydrocarbons in the presence of a fluorine-containing catalyst, the improvement which comprises passing effluents of such a hydrocarbon conversion to a settling zone, removing from said zone liquid hydrocarbon material containing a relatively small amount of organic fluorine compounds as impurities, passing said material to a distillation zone containing a solid dehydrofluorinating material, maintaining contents of said zone at a dehydrofluorination temperature, removing as a low-boiling fraction from said zone a gaseous mixture comprising free hydrogen fluoride, passing a minor portion of said gaseous mixture to said distillation zone at a point below that at which the aforesaid liquid paraffin hydrocarbon material is introduced, and removing as a high-boiling fraction from said zone liquid hydrocarbon material substantially free from hydrogen fluoride and organic fluorine compounds.

11. In a process for the conversion of hydrocarbons in the presence of a fluorine-containing catalyst, the improvement which comprises passing effluents of such a hydrocarbon conversion to a settling zone, removing from said zone liquid hydrocarbon material containing a relatively small amount of organic fluorine compounds as impurities, passing said material to a distillation zone containing a solid dehydrofluorinating material, maintaining contents of said zone at a dehydrofluorination temperature, removing as a low-boiling fraction from said zone a gaseous mixture comprising free hydrogen fluoride, passing a minor portion of said gaseous mixture to said distillation zone, and removing as a high-boiling fraction from said zone liquid hydrocarbon material substantially free from hydrogen fluoride and organic fluorine compounds.

JAMES D. GIBSON.

REFERENCES CITED

The following references are of record in the file of this patent:

UNITED STATES PATENTS

| Number | Name | Date |
| --- | --- | --- |
| 2,341,567 | Moriarty | Feb. 15, 1944 |
| 2,347,317 | Gibson | Apr. 25, 1944 |
| 2,347,945 | Frey | May 2, 1944 |
| 2,396,844 | Grosse et al. | Mar. 19, 1946 |